United States Patent [19]

Tracy et al.

[11] Patent Number: 5,293,854
[45] Date of Patent: Mar. 15, 1994

[54] INJECTION PUMP THROTTLE DASHPOT FOR TRANSIENT SMOKE CONTROL

[75] Inventors: Lawrence P. Tracy; Richard G. Norton, both of Hudson, Iowa

[73] Assignee: Deere & Company, Moline, Ill.

[21] Appl. No.: 62,669

[22] Filed: May 14, 1993

[51] Int. Cl.⁵ .............................................. F02D 31/00
[52] U.S. Cl. ...................................... 123/370; 123/385
[58] Field of Search ............... 123/370, 371, 381, 378, 123/377, 376, 388, 385, 387, 382, 383

[56] References Cited

U.S. PATENT DOCUMENTS

| | | | |
|---|---|---|---|
| 2,177,120 | 10/1939 | Schaeren | 123/387 |
| 2,571,571 | 10/1951 | Hanners | 123/370 |
| 2,708,921 | 5/1955 | Links | 123/385 |
| 3,685,501 | 8/1972 | Honda | 123/378 |
| 4,176,642 | 12/1979 | Shipinski | 123/381 |
| 4,200,075 | 4/1980 | Takahashi | 123/385 |
| 4,328,777 | 5/1982 | Yasohara | 123/370 |
| 4,368,706 | 1/1983 | Yasohara | 123/370 |
| 4,567,870 | 2/1986 | Tumber | 123/370 |
| 4,664,079 | 5/1987 | Sakuranaka | 123/370 |
| 4,972,819 | 11/1990 | Engfer | 123/370 |

*Primary Examiner*—Carl S. Miller

[57] ABSTRACT

The present invention provides a very simple structure to delay high fuel delivery to a turbocharged engine until a sufficient turbocharger boost pressure is available for adequate combustion, by providing a simple dashpot to limit movement of the throttle shaft. A breaaway throttle lever is used so that the operator can position the control lever at any position, even though the position of the throttle shaft itself is being limited by the dashpot. Preferably, the damping structure is entirely housed within the fuel injector pump, where it will be safe from debris, and constantly flushed with clean fuel.

11 Claims, 3 Drawing Sheets

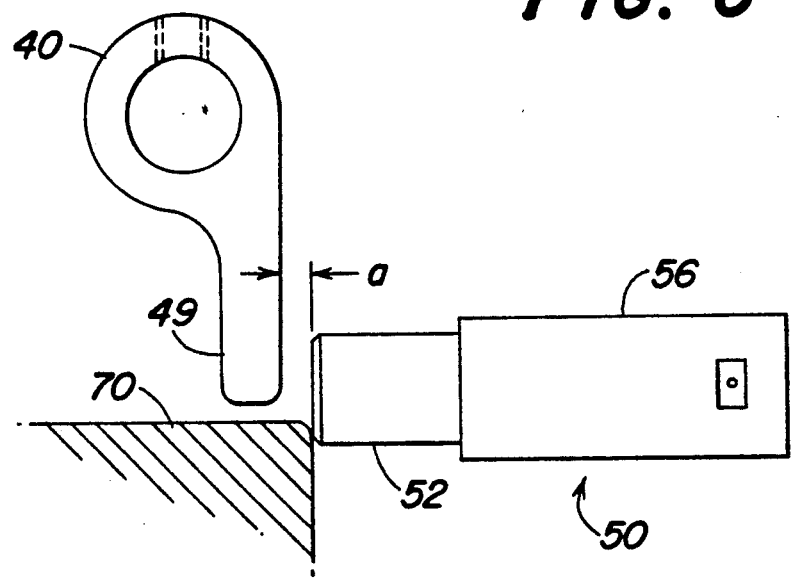

INJECTION PUMP THROTTLE DASHPOT FOR TRANSIENT SMOKE CONTROL

BACKGROUND OF THE INVENTION

Field of the Invention

The present invention relates to control systems for fuel injection pumps, and in particular to systems to limit transient smoke during sudden changes in the throttle position of a turbocharged engine.

Description of the Related Art

Emissions regulations for diesel engines include limits on peak, acceleration, and lug exhaust smoke levels as measured by the US Federal Smoke Cycle. High brake mean effective pressure (BMEP) turbocharged engines cannot meet the peak and acceleration smoke limits without the use of devices that delay high fuel deliveries until sufficient turbocharger boost pressure is available for adequate combustion.

This delay can currently be accomplished in two different ways. First is to use an electronic delay. This requires an electronically metered fuel system which may or may not be present on the vehicle. Second is to use an aneroid control which detects the turbocharger pressure directly and uses it to control the fuel injection volume. Such an aneroid requires an intake manifold pressure tap, piping, pressure-to-motion transducer and complicated internal pump linkages.

SUMMARY OF THE PRESENT INVENTION

The object of the present invention is to provide a simple mechanism for limiting high fuel delivery in a turbocharged engine until sufficient turbocharger boost pressure is available for adequate combustion, without needing an electronic delay or an aneroid.

This object is achieved according to the present invention by providing a dashpot or similar motion damping device which limits movement of the throttle shaft. In particular, the dashpot prevents rapid rotational movement of the throttle shaft, thereby delaying high fuel deliveries until sufficient turbocharger boost is available for adequate combustion. Such a structure is best used with a "break-away" throttle connection, already found on most existing fuel injection pumps.

The invention results in a significant reduction in acceleration and peak smoke as measured during the federal smoke cycle test, as well as the visible "puff" of smoke that would be seen coming from a vehicle exhaust stack. At the same time, using the dashpot with a break-away throttle lever allows rapid movement of the throttle control by the operator.

Use of a dashpot in this fashion has several advantages:

It is simple. No control system or complicated connections are required as with an aneroid-type smoke limiter or an electronic delay limiter.

It is extremely low-cost. No external controls are needed. No expensive electronics are required.

It is extremely durable. A dashpot is extremely simple hardware, and, if positioned inside the fuel pump housing, is lubricated by clean fuel.

Finally, if positioned inside the fuel pump housing, the dashpot is highly tamper-resistant. The customer would have to partially disassemble the fuel injection pump to disable the dashpot.

BRIEF DESCRIPTION OF THE DRAWINGS

The invention will be described in greater detail with reference to the following drawings, in which:

FIG. 6 is an alternative embodiment of the dashpot cam according to the present invention.

DETAILED DESCRIPTION OF THE PREFERRED EMBODIMENTS

Figure 1:
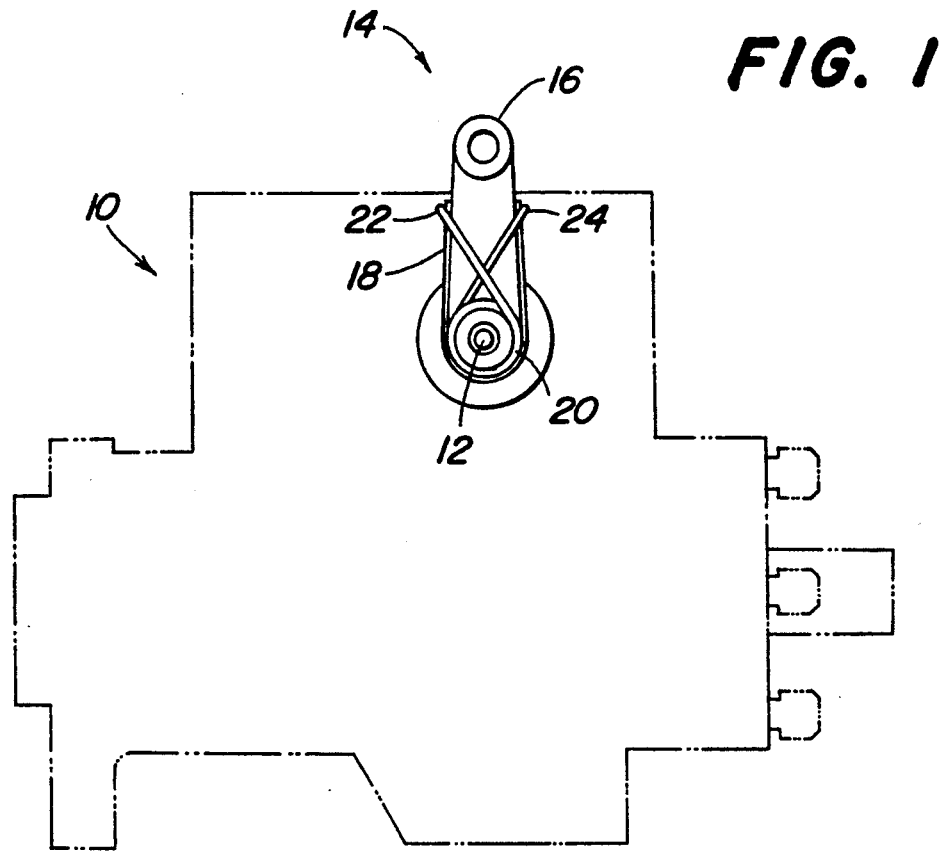
FIG. 1 illustrates a break-away throttle mounted to a fuel injection pump, shown in phantom.

FIG. 1 generally illustrates in phantom the outline of a fuel injection pump 10. The fuel injection pump 10 injects a varying volume of fuel into an engine (not shown) dependent upon the rotational position of a throttle shaft 12.

A break-away throttle lever 14 is mounted to the throttle shaft 12 to control the rotational position thereof. Any suitable break-away throttle lever design could be used, and the one illustrated is simply by way of example. The break-away throttle lever 14 shown in the drawing has a primary lever 16 rotatably mounted on or near one end of the throttle shaft 12. The position of the primary lever 16 is controlled directly by the operator through a suitable linkage (not shown). A secondary lever 18 is positioned behind the primary lever 16 and is fixed to the throttle shaft 12 A spring clip 20 is positioned around the throttle shaft 12 and has ends 22, 24 engageable with both the primary lever 16 and the secondary lever 18.

As will be apparent, if the operator moves the primary lever 16 to the left as seen in FIG. 1, spring clip end 22 will be moved to the left by action of the primary lever 16, while spring slip end 24 will gradually force the secondary lever 18 parallel to the primary lever 16 under the spring action of the spring clip 20. The opposite will be true if the operator moves the primary lever 16 to the right as seen in the FIGURE.

Figure 2:
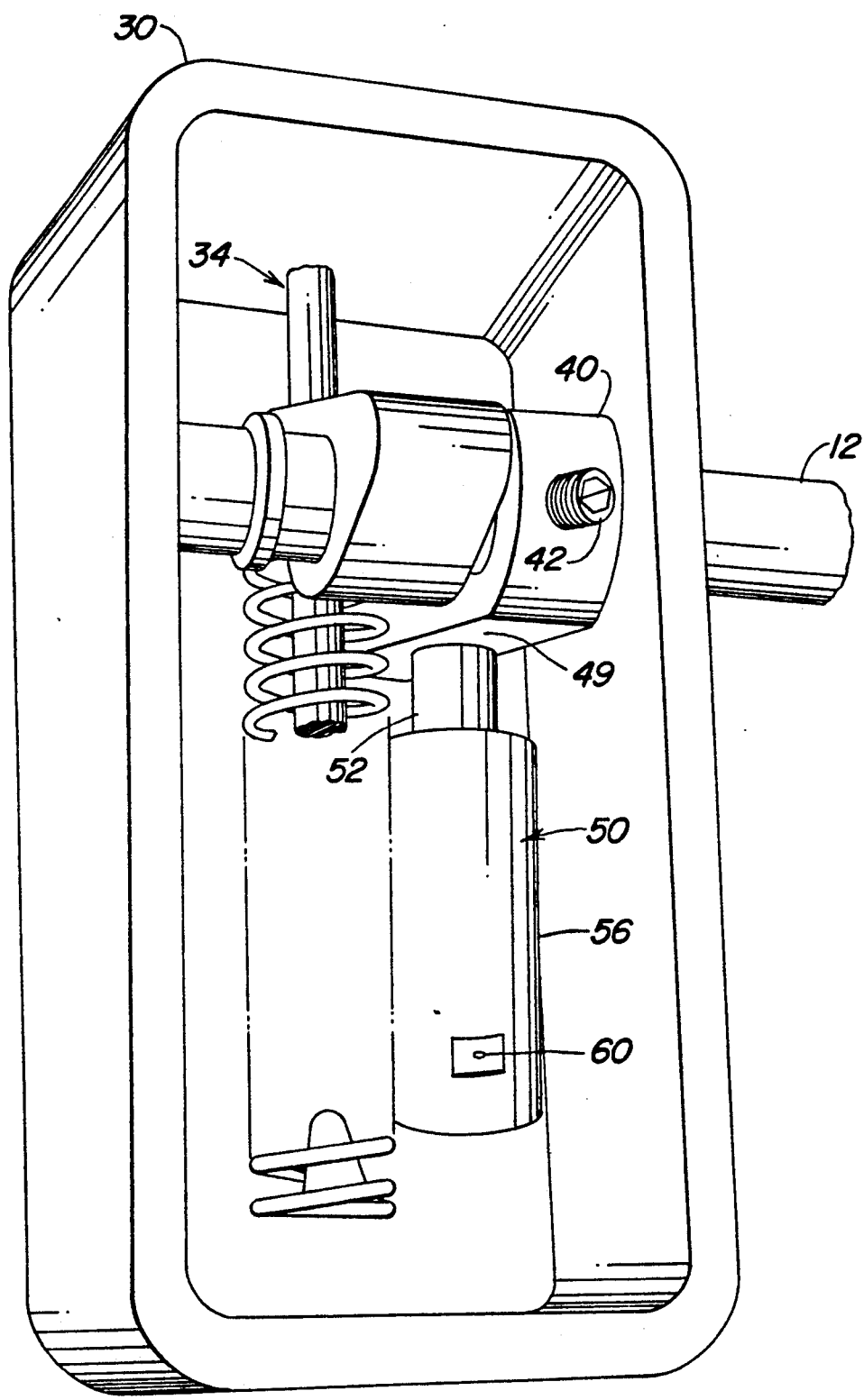
FIG. 2 is a perspective view of a detail of the fuel injection pump from the top, with the cover removed, showing an embodiment of the dashpot and cam according to the present invention.

Turning to FIG. 2, a portion of the housing 30 of the fuel pump is shown. The throttle shaft 12 is rotatably mounted in this portion of the housing 30, with the break-away throttle lever 14 mounted near an end (not shown) of the throttle shaft 12. Inside the housing 30, the throttle shaft has a lever mechanism 32 which, together with various additional mechanisms 34, serve to control the output fuel volume of the fuel injector pump in accordance with the rotational position of the throttle shaft 12. Such additional mechanisms are well known in the fuel pump art and will not be described further herein.

Figures 3, 4:
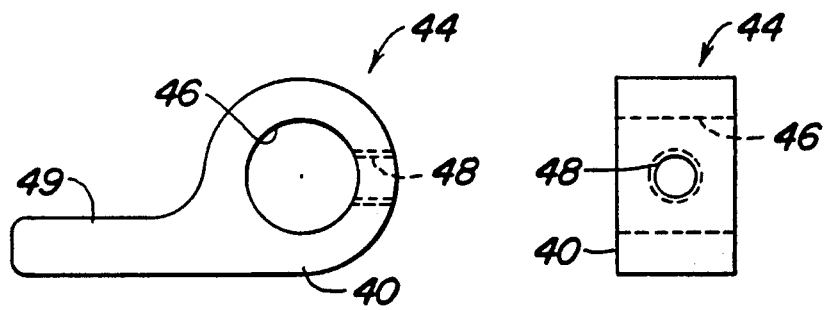
FIG. 3 and 4 are side and end views of the cam of FIG. 2.

According to the present invention, a cam structure 40 is mounted about the throttle shaft 12 and fixed for rotation with the throttle shaft 12 by a set screw 42. As shown in detail in FIGS. 3 and 4, the cam structure 40 generally includes a circular portion 44 having a central bore 46 formed therein which fits snugly around the throttle shaft 12. A threaded bore 48 also is formed therein for holding the set screw 42. Last, a leg 49 extends outwardly from the circular portion 44.

Figure 5:
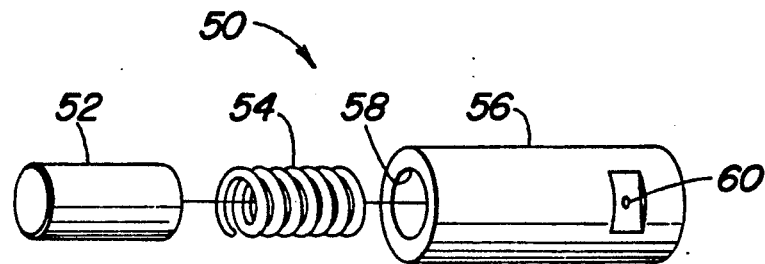
FIG. 5 is an exploded view of the dashpot of FIG. 2.

Returning to FIG. 2, according to the invention a dashpot 50 is mounted in the housing 30 adjacent to the cam structure 40. As shown in exploded view in FIG. 5, the dashpot 50 includes generally a piston 52, a spring 54, and a cylinder 56 having a central bore 58 formed therein into which the piston 52 and spring 54 can fit. The cylinder 56 also has a bleed orifice 60 formed therein towards the end thereof away from the piston 52.

Returning to FIG. 2, the dashpot 50 is mounted inside the housing 30 by any suitable means, e.g., by adhesive attachment to the inner wall of the housing 30, with the piston 52 abuttable against the leg 49 of the cam structure 40. In normal operation, the inside of the housing 30 would be filled with fuel, which can enter and leave the cylinder 56 through the bleed hole 60.

As will be apparent from studying FIG. 2, if the operator moves the break-away throttle lever 14 in the direction which rotates the throttle shaft 12 such that the leg 49 of the cam structure 40 presses against the piston 52, movement of the throttle shaft will be slowed down as the piston 52 is forced into the cylinder 56. The rate at which this can take place will depend on the combined effects of the spring constant of the spring clip 20 on the break-away shuttle, the spring 54 in the dashpot, and the flow rate of the fuel through the bleed orifice 60. Thus, by appropriate selection of these elements, any desired delay rate can easily be built into the fuel pump, and the designer can simply match the delay rate to the delay needed to avoid a smoke puff, etc. Such a delayed movement of the throttle shaft 12 is no problem for the operator, because of the use of the break-away throttle 14.

As will also be apparent from studying FIG. 2, movement of the throttle shaft 12 in the opposite rotational direction will not be limited by the dashpot 50, so the delay only comes into play when it is needed.

Turning to FIG. 6, an alternative embodiment of the damper according to the present invention provides a stop 70 against which the piston 52 can abut. This stop 70 provides a gap a through which the cam 40 can rotate freely before being affected by the dashpot 50. The exact position of the stop 70 is selected so that small accelerations (i.e., those in which there are limited smoke problems) will be unaffected by the dashpot 50. The stop 70 can conveniently be formed by casting it into the housing 30 (not shown in FIG. 6). Such a stop 70 would be particularly useful with min-max type governors, if quick throttle response is desired.

Numerous modifications to the present invention will be readily apparent to one of ordinary skill in the art. For example, any of a great variety of break-away throttle lever structures could be used. Similarly, an especially simple dashpot has been used which is easily adjustable simply by adjusting the size of the orifice 60 or the strength of the spring 54. Any other similar suitable dashpot could be used. Likewise, the shape of the cam structure 40 could have a great variety of alternatives.

As will be apparent, the greatest benefit to the present invention is its utter simplicity. It accomplishes the needed damping without any a separate control system, and it will fit easily inside of a conventional fuel injector pump housing.

While the present invention has been described in conjunction with a specific embodiment, it is to be understood that many alternatives, modifications and variations will be apparent to those skilled in the art in light of the foregoing description. Accordingly, this invention is intended to embrace all such alternatives, modifications and variations which fall within the spirit and scope of the appended claims.

I claim:

1. A damper for a fuel injection pump, the injection pump having:
   a. a mounting structure;
   b. a throttle shaft rotatably mounted to said mounting structure;
   c. adjustable fuel pressurization means controlled by said throttle shaft for providing different fuel output volumes depending on the rotational position of said throttle shaft; and
   d. a throttle control lever pivotally mounted to said throttle shaft to be pivotal between first and second positions relative to said shaft and for controlling the rotation of said throttle shaft; the damper comprising:
   e. a cam mounted to said throttle shaft for rotation therewith;
   f. a dashpot mounted to said mounting structure and selectively abutting against said cam to dampen motion of said cam and said throttle shaft in at least one direction.

2. The damper of claim 1, wherein said mounting structure comprises a housing, and said cam and said dashpot are mounted within said housing.

3. The damper of claim 2, wherein said dashpot comprises a cylinder, a piston partially within said cylinder and a spring entirely within said cylinder biasing said piston outwardly from said cylinder.

4. The damper of claim 3, wherein said cam moves towards said piston when said throttle shaft is rotated in one direction, and away from said piston when said throttle shaft is rotated in the opposite direction, said piston engaging said cam at least when said cam moves toward said piston past a predetermined distance.

5. The damper of claim 4, further comprising a stop against which said piston abuts at a predetermined position as said throttle shaft is rotated to move said cam away from said piston.

6. The damper of claim 4, wherein said housing is filled with a working fluid, and a bleed vent is formed in said cylinder.

7. The damper of claim 6, wherein said bleed vent serves as a flow-limiting orifice to control flow of the working fluid out of said cylinder when the piston is pressed into said cylinder by said cam upon rotation of said throttle shaft, said orifice thereby serving to partially regulate the damping envelope of said dashpot.

8. The damper of claim 2, wherein pivoting of said throttle control lever relative to said throttle shaft is limited by spring which bias said throttle control lever to a predetermined position relative to said throttle shaft.

9. The damper of claim 8, wherein the throttle control lever is a break-away lever.

10. A damped fuel injection pump, comprising:
   a. a housing;
   b. a throttle shaft rotatably mounted to said housing and extending both inside and outside of said housing;
   c. a break-away throttle control lever mounted to said throttle shaft on the outside of said housing for controlling the rotation of said throttle shaft;
   d. adjustable fuel pressurization means inside said housing controlled by said throttle shaft for providing different fuel output volumes depending on the rotational position of said throttle shaft;

e. a cam mounted to said throttle shaft inside said housing for rotation with said throttle shaft;

f. a dashpot mounted to said mounting structure inside said housing and selectively pressing against said cam to dampen motion of said cam and said throttle shaft in at least one direction.

11. The pump of claim 10, wherein said housing is filled with fuel, and said dashpot comprises:

a. a cylinder;

b. a piston partially within said cylinder;

c. a spring entirely within said cylinder biasing said piston outwardly from said cylinder; and d. a flow-limiting orifice formed in said cylinder toward an end thereof away from said piston for controlling flow of the fuel out of said cylinder when said piston is pressed into said cylinder by said cam upon rotation of said throttle shaft.

* * * * *